United States Patent [19]

Albagnac

[11] Patent Number: 4,468,935
[45] Date of Patent: Sep. 4, 1984

[54] DEVICE FOR REGULATING A JOULE-THOMSON EFFECT REFRIGERATOR

[75] Inventor: René D. M. Albagnac, Paris, France

[73] Assignee: Societe Anonyme de Telecommunications, Paris, France

[21] Appl. No.: 455,570

[22] Filed: Jan. 4, 1983

[30] Foreign Application Priority Data

Jan. 19, 1982 [FR] France ............................ 82 00756

[51] Int. Cl.³ ............................................. F25B 19/00
[52] U.S. Cl. ......................... 62/514 JT; 236/101 R; 236/102
[58] Field of Search .................. 62/514 JT; 236/93 R, 236/101 R, 102

[56] References Cited

U.S. PATENT DOCUMENTS

| | | | |
|---|---|---|---|
| 2,418,671 | 4/1947 | Schweller | 62/8 |
| 3,415,077 | 12/1968 | Collins | 62/467 |
| 3,714,796 | 2/1973 | Longsworth | 62/514 |
| 3,800,552 | 4/1974 | Sollami et al. | 62/293 |
| 3,885,939 | 5/1975 | Markum | 62/474 |
| 3,913,581 | 10/1975 | Ritson et al. | 128/303.1 |
| 4,056,745 | 11/1977 | Eckels | 62/514 JT |
| 4,278,090 | 7/1981 | van Gerven | 62/514 JT |

FOREIGN PATENT DOCUMENTS

| | | |
|---|---|---|
| 5048 | 10/1979 | European Pat. Off. . |
| 20111 | 12/1980 | European Pat. Off. . |
| 1267447 | of 1961 | France . |
| 2176544 | 11/1973 | France . |
| 2360848 | 3/1978 | France . |
| 2477406 | 9/1981 | France . |

Primary Examiner—Ronald C. Capossela
Attorney, Agent, or Firm—David B. Harrison

[57] ABSTRACT

Device comprising an inlet duct for a gaseous refrigerating fluid under pressure connected to a choke opening into a fluid expansion and liquefaction chamber connecting with a refrigerating fluid discharge passage which exchanges heat with the said inlet duct, characterized in that, for the pressure range involved, the minimum opening (15) of the choke (10) and the heat exchange relationships with the inlet duct (7, 8) are such that in the minimum opening operating phase a liquefaction phase arises in the inlet duct upstream of the choke, so producing self-regulation producing the fluid flow just necessary to maintain liquefaction in the expansion and liquefaction chamber.

3 Claims, 4 Drawing Figures

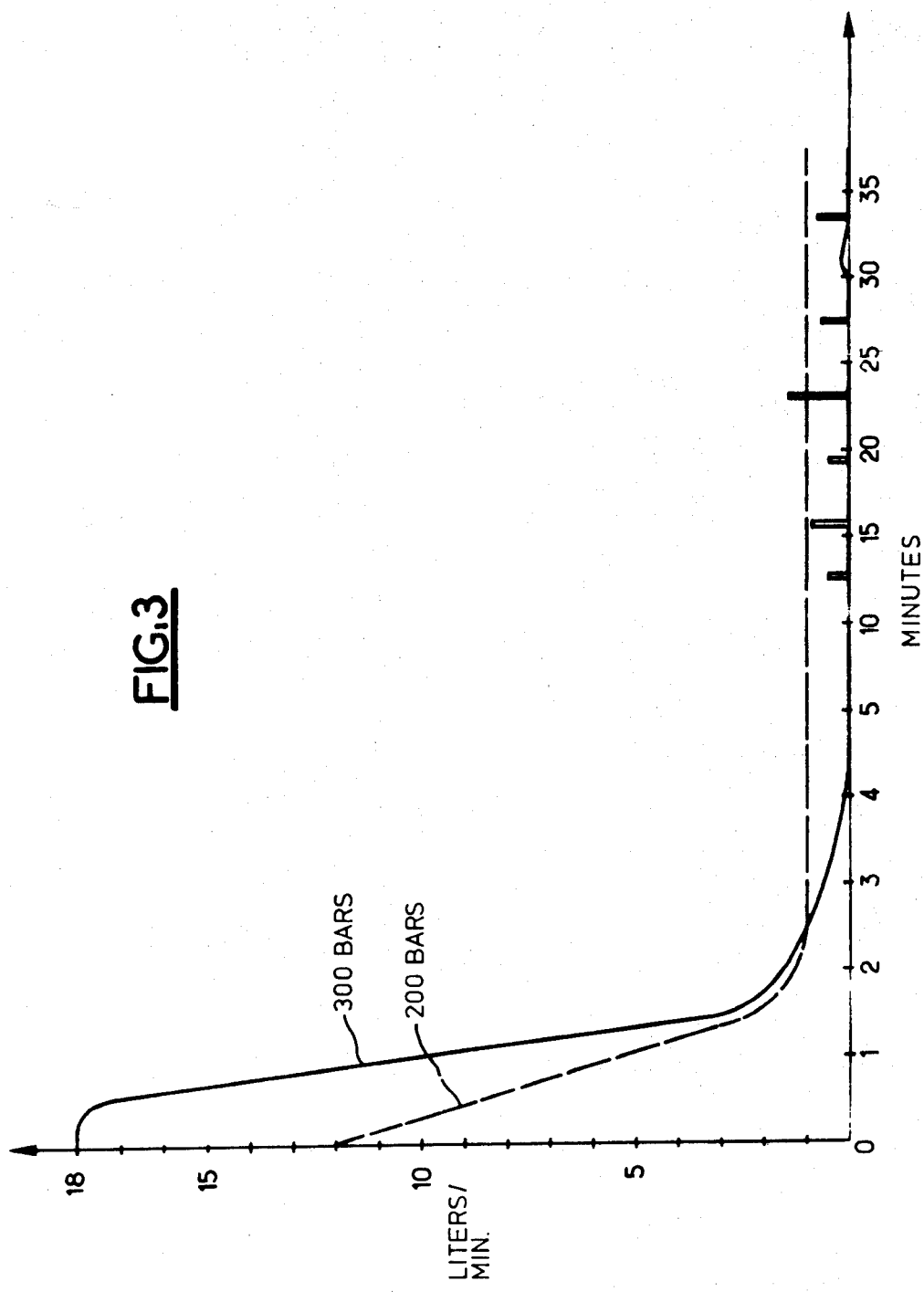

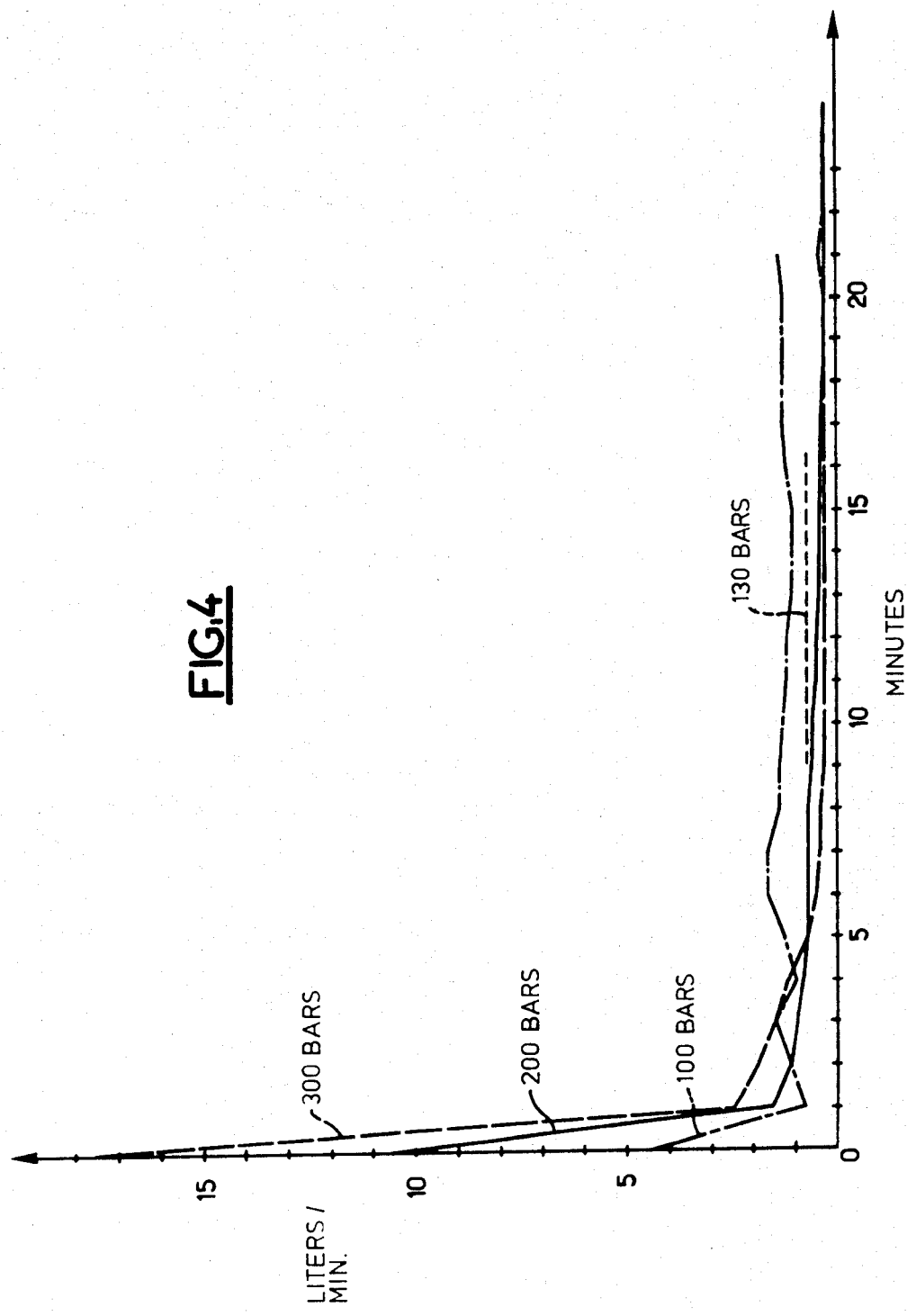

DEVICE FOR REGULATING A JOULE-THOMSON EFFECT REFRIGERATOR

The invention relates to a device for regulating a Joule-Thomson effect refrigerator, comprising an inlet duct for cooling fluid under pressure to which a choke is connected which opens into an expansion and refrigeration chamber which connects with a passage for heat exchange with the said inlet duct; this choke is regulated to provide a decreasing flow as the refrigeration temperature drops.

Such a refrigerator may be of the closed or open circuit type, and it finds special application notably in open circuit for weapons systems using projectiles with homing heads responding to infrared radiation, in which a sensitive detector cell is used which must be capable of being quickly cooled to a low temperature, theoretically the cooling fluid liquefaction temperature, and this for some time; thus the advantage of a regulation system like the one described for reducing the consumption of refrigerating fluid, and even the weight of the projectile, as much as possible when it is of the self-contained feed type.

Devices are already known which set up for this purpose an all-or-nothing type of control of the choke's regulated passage cross-section, moderated by maintaining a constant minimum fluid flow opening in the choke which is worked out so as to compensate for the heat losses of the refrigerator.

This preset determination cannot be perfect and adjust to the changing conditions governing heat losses in the various conditions of use of the refrigerator which may be met by a projectile fitted with it.

The object of the present invention is an improved Joule-Thomson refrigerator regulation device designed to provide better control of the refrigerating power provided during operation, so that it is better suited to real requirements, without any risk of inadequacy (which adversely affects detection based on the low temperature set up) and without fluid consumption exceeding that which is just necessary (which is favourable with regards to the projectile's range or weight).

Essentially, to this end, the device according to the invention regulating a Joule-Thomson effect refrigerator comprising an inlet duct for a gaseous refrigerating fluid under pressure connected to a choke opening into a fluid expansion and liquefaction chamber connecting with a refrigerating fluid discharge passage exchanging heat with the said inlet duct, the said choke having a passage cross-section which decreases as the refrigeration temperature drops and has a preset minimum passage opening, is characterized in that, for the range of pressure involved, the minimum opening of the choke and the heat exchange relationships with the said inlet duct are such that in the minimum opening operating phase a liquefaction phase arises in the inlet duct upstream of the choke so producing self-regulation producing the fluid flow just necessary to maintain liquefaction in the expansion and liquefaction chamber.

An embodiment of the regulation device according to the invention is moreover described below as an example, reference being made to the appended drawings, in which:

FIGS. 2, 3 and 4 are gaseous fluid flow graphs corresponding to several constructional cases of a Joule-Thomson effect refrigerator.

Figure 1:
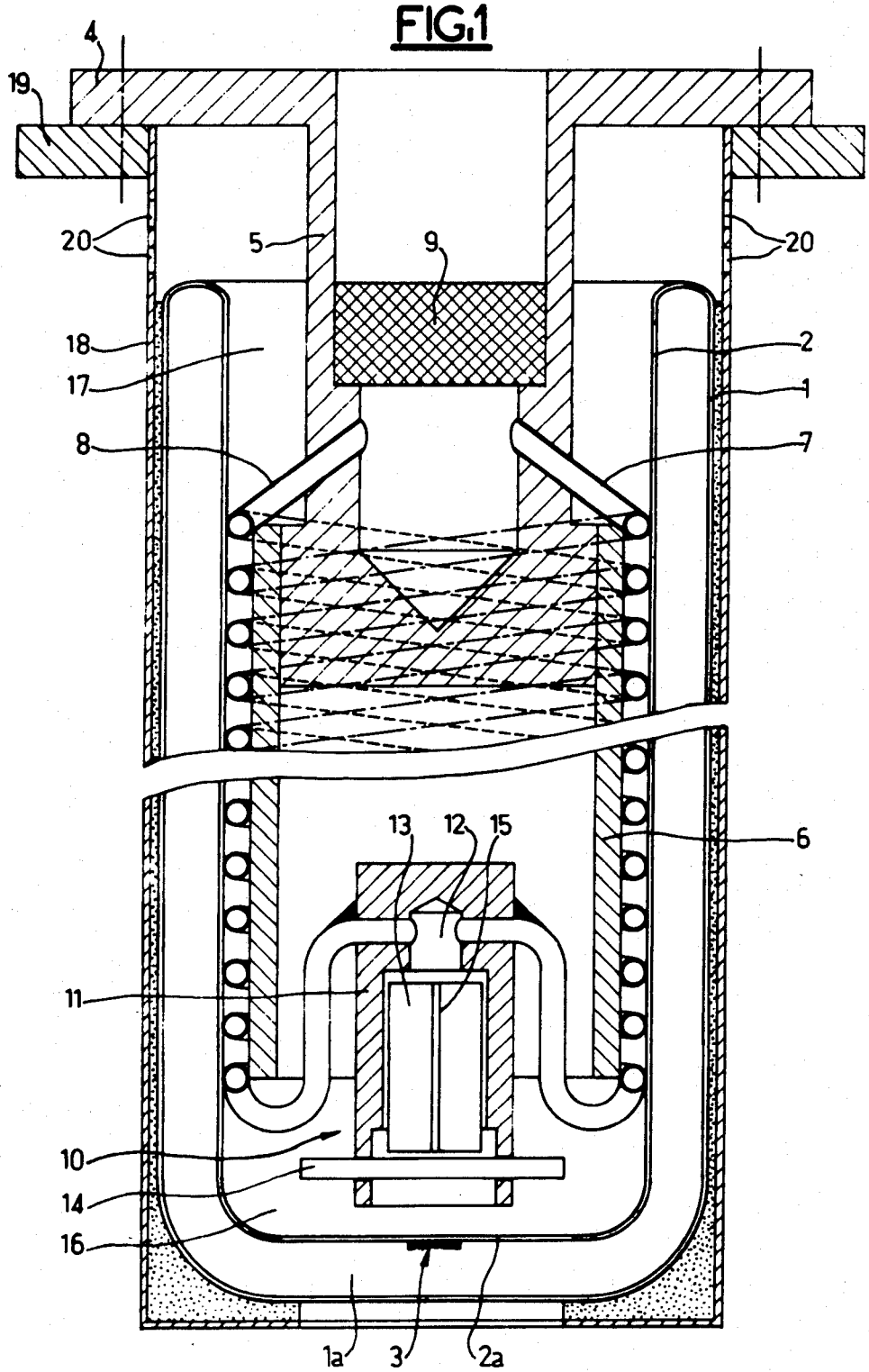
FIG. 1 is an axial section view of a Joule-Thomson effect refrigerator regulated according to the invention.

The refrigerator shown comprises a double-walled Dewar flask 1, 2 whose internal bottom wall 2a is provided, opposite the bottom wall 1a letting through the infrared radiation along the Dewar centre line, with a detector cell 3 sensitive to infrared and having connecting leads not shown leaving the Dewar's vacuum enclosure and intended to be connected to the electronic detection circuit. The refrigerator, which comprises a flange 4 with a neck 5 connecting to a feed duct, not shown, connected to a source of gaseous refrigerating fluid under high pressure, is placed inside the Dewar. This neck 5 also forms the end plug of a tubular body 6 to which it is fixed, and round which two tubular ducts 7 and 8 are spiral-wound; one of the ends of each of the tubular ducts 7 and 8 is connected to the feed neck 5, downstream of a filter 9 fitted into this neck, the other end of each of the ducts being connected, at the end of the body 6, to the choke 10 installed to enter this body. This choke is here made in accordance with the applicant's French patent application No. 81 13346 to which U.S. Pat. No. 4,419,867 corresponds. It comprises a tubular shaped nozzle 11 closed at one end, forming an admission chamber 12 to which the ends of the tubular ducts 7 and 8 are connected and in which a smaller diameter choke core 13, held in by a stop pin 14 and having an axial groove 15, is placed. The nozzle opens into the expansion and refrigeration chamber 16 formed by the internal part of the Dewar not taken up by the assembly just described. It will be noted that the tubular ducts 7 and 8 are applied in close contact with the internal wall of the Dewar. In order to get good heat exchange qualities, in addition, tubes 7 and 8 and the body 6 can be tinned and then soldered by fusion of this tin coating, thus forming contact beads between them. By a known method it is also possible to insert cold calorie storage packing elements between the turns of tubes 7 and 8. After expansion and liquefaction in chamber 16 extending inside the body 6, the refrigerating fluid is made to leave the Dewar discharging to the atmosphere after heat exchange with the fluid brought in through ducts 7 and 8 and flowing through the spaces left free between these ducts, the body 6 and the wall of the Dewar, and then into a chamber 17 arranged between assembly 4, 5 and a tube 18 protecting the Dewar, which tube is fitted with a flange 19 for fixing to flange 4 and has side vents 20. An elastomer composition, designed to improve protection for the Dewar, is placed between the Dewar and its protection tube.

Flow regulation of the fluid in the choke and thus the refrigerating power obtained in operation result first of all here from the selection of two materials with differing coefficients of expansion for the nozzle 11 and the core 13, for example nozzle of nickel and core of invar. Thus, with a nozzle having a greater coefficient of expansion than the core an initial relatively rapid operational flow of the refrigerating fluid can be obtained under its source pressure, by choosing an initial preset clearance existing at ambient temperature between the nozzle and the core which will therefore decrease with the refrigeration temperature achieved down to a minimum residual passage cross-section value resulting from tightening of the nozzle on the core and corresponding to the cross-section of the axial groove 15. According to the improved regulation which is the object of this invention, this passage cross-section and the heat exchange relationships of the refrigerant with the ducts 7 and 8 are chosen so that, in the minimum opening operation phase, a liquefaction phase arises in the inlet duct upstream of the choke, so producing self-regulation of the fluid flow just necessary for maintaining liquefaction in the expansion and liquefaction chamber, whatever may be the particular conditions of heat dissipation into the environment. The graphs in FIGS. 2 to 4 will give a clearer understanding of the self-regulation which is the object of the invention; the ordinates of these graphs all indicate the refrigerant gaseous fluid flow in liters/minute at its pressure of discharge from the refrigerator, slightly higher than atmospheric pressure, and their abscissae indicate the measurement times in minutes. They are all obtained, at the pressures indicated for each curve, with a device of the type described comprising a minimum choke opening cross-section of about 500μ squared and two inlet tubes measuring 0.25×0.5 mm, but of different lengths in the various graphs.

Figure 2:
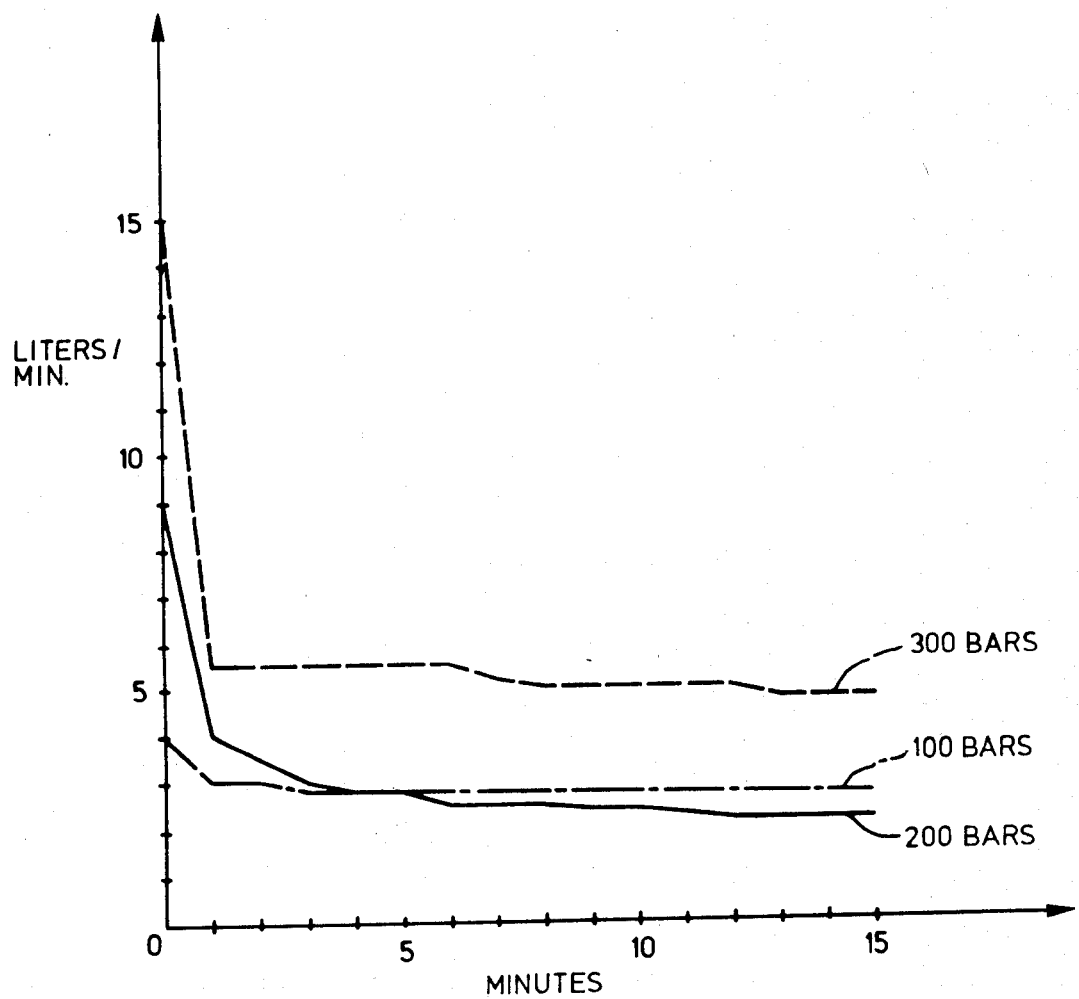

The graph in FIG. 2 corresponds to flow measurement curves recorded with a device having two inlet tubes each approximately 20 cm long, wound in 10 offset turns round the central body 6, these curves being drawn up respectively for pressures of 300, 200 and 100 bars.

The graph in FIG. 3 corresponds to flow measurement curves recorded with a device having two inlet tubes approximately 35 cm long, wound in 17.5 offset turns round the central body, these curves being drawn up respectively for pressures of 300 and 200 bars.

The graph in FIG. 4 corresponds to flow measurement curves recorded with a device having two inlet tubes each approximately 26 cm long, wound in thirteen offset turns round the central body, these curves being drawn up respectively for pressures of 300, 200 and 100 bars, with an intermediate partial plot at 130 bars.

Comparative inspection of these graphs, comparing the curves in FIG. 2 and those in FIGS. 3 and 4, reveals that the system of FIG. 2 produces the required cold at a maintenance regime for which it has a flow of around 5 liters at 300 bars, 2.3 liters at 200 bars and 2.7 liters at 100 bars, which is well above the flow revealed by reading the analogous curves of FIGS. 3 and 4; this is explained by inadequate heat exchange between the expanded cooled phase and the gaseous phase circulating in the inlet tubes.

The graph in FIG. 3 (where it will be noted that the time scale has been multiplied by 5 minutes on) shows up an undesirable case with the 300-bar curve for which the flow drops as far as zero and only recovers periodically, as if the regulation involved was of the all-or-nothing type, with the zero flow periods representing an adverse and unacceptable fall in the sensitivity of the less well cooled detector cell (which is recorded by the value of the current it delivers). It is a fact, in this case, that a liquid phase has been produced in the inlet tubes located at the heart of the device and can only be driven out from there under the source pressure after resorption of the liquefied phase downstream of the expansion orifice. It is only at 200 bars, on the other hand, that satisfactory cold generation operation occurs, but again with a maintenance flow of 0.9 to 1 liter.

The graph in FIG. 4 corresponds to a graph of a device provided with a self-regulation system according to the invention, for which the required cold is constantly maintained and for which there is a minimum maintenance flow with equal fluid pressure in the 100- to 300-bar range, with several intermediate pressures as shown. As has been explained this self-regulation arises from the creation of a changeable liquefied phase in the inlet tubes upstream of the choke which does not block the tubes since it can always be discharged by the gas inlet pressure, and it will be observed in particular that, as opposed to what is shown by the graph in FIG. 2 where the maintenance flow is higher the higher the inlet pressure, the opposite occurs advantageously in the case of the self-regulation device according to the invention. This self-regulation is facilitated by using a multitubular inlet duct, bitubular in the example described which is not restrictive, since, for an equal length and heat exchange capacity of the inlet duct, the fact that this duct is divided into several tubes means that for any given pressure there is a lower discharge pressure loss on discharge of the liquefied phase designed to be formed in these tubes upstream of the choke.

Of course, various embodiments of the device proper can be conceived whilst still remaining within the framework of the invention.

I claim:

1. A device for regulating a Joule-Thomson effect refrigerator comprising:
    (a) an inlet neck connected to a supply of gaseous refrigerating fluid under pressure;
    (b) a fluid expansion chamber in which said gaseous fluid expands thereby cooling and partly liquifying itself by Joule-Thomson effect;
    (c) fluid transfer means connecting said inlet neck to said fluid expansion chamber, said fluid transfer means for transferring said refrigerating fluid from said neck to said chamber along a fluid path and for providing heat exchange relation with said expansion chamber;
    (d) restriction means interposed in said fluid path between said fluid transfer means and said expansion chamber for controlling delivery of said fluid, said restriction means for providing heat exchange with said chamber and having a passage cross-sectional area automatically decreasing with the decreasing temperature thereof thereby providing a main regulator of said delivery and having a minimum cross-sectional area maintained upon further decreasing of temperature which is sized to liquify partially said gaseous fluid in said fluid transfer means in a predetermined liquid to gas proportion sufficient to maintain a predetermined low temperature of said restriction means thereby causing said main regulator to remain closed, wherein said restriction means includes a tubular body having a bore and a core restrained in said bore against dragging and leaving therebetween a small passage, the cross-sectional area of said passage being controlled by difference in the coefficients of expansion of said bore and said core respectively, with an auxiliary passage of minimum cross-sectional area designed to remain open.

2. The regulating device set forth in claim 1 wherein said fluid transfer means includes a plurality of ducts connected in parallel.

3. A device for regulating a Joule-Thomson effect refrigerator as recited in claim 1 wherein said minimum cross-sectional area of said restriction means is sized to create a changeable liquified phase of fluid within said fluid transfer means when said fluid is supplied to said restriction means under pressure in a range from 100 to 300 bars thereby enabling a continuous fluid flow through said restriction means in a range of 0.2 to 2.0 liters per minute after an initial start-up and cool down period of one to five minutes.

* * * * *